(12) United States Patent
Müller et al.

(10) Patent No.: US 6,384,988 B1
(45) Date of Patent: May 7, 2002

(54) ILLUMINATED OPTICAL ENLARGEMENT DEVICE

(75) Inventors: Peter Müller, Schoffengrund; Horst Glaum, Langgons; Rüdiger Hempfling, Budingen, all of (DE)

(73) Assignee: Lifatec GmbH Faseroptik und Optoelektronik (DE)

( * ) Notice: Subject to any disclaimer, the term of this patent is extended or adjusted under 35 U.S.C. 154(b) by 0 days.

(21) Appl. No.: 09/634,349

(22) Filed: Aug. 8, 2000

(30) Foreign Application Priority Data

Oct. 22, 1999 (DE) .......................... 199 50 899

(51) Int. Cl.$^7$ ............................................. G02B 27/02
(52) U.S. Cl. ....................... 359/798; 359/799; 359/802; 359/803; 362/33
(58) Field of Search ............................... 359/798, 799, 359/800, 801, 802, 803, 804, 805, 806, 807, 808, 809; 362/33

(56) References Cited

U.S. PATENT DOCUMENTS 2,476,783 A * 7/1949 Turnerr et al. .............. 362/208
5,196,964 A * 3/1993 Heine et al. ................. 359/800
5,209,757 A * 5/1993 Krug et al. .................. 606/162
5,548,352 A * 8/1996 Dewey .................... 351/160 H
D423,030 S * 4/2000 Yuen .......................... D16/135
6,186,944 B1 * 2/2001 Tsai ............................ 600/200
6,322,226 B1 * 11/2001 Dickson ....................... 362/33

FOREIGN PATENT DOCUMENTS

| DE | 3906555 | 7/1989 | .......... G02B/21/06 |
| DE | 3915119 C1 | 6/1990 | .......... G02B/25/02 |
| DE | 19653234 | 11/1997 | .......... G02B/21/06 |
| JP | 09021964 | 1/1997 | .......... G02B/25/02 |
| JP | 2001-159737 | * 6/2001 | .......... G02B/25/02 |

* cited by examiner

Primary Examiner—Georgia Epps
Assistant Examiner—Saeed Seyrafi
(74) Attorney, Agent, or Firm—Hoffman, Wasson & Gitler

(57) ABSTRACT

An illuminated optical magnifying device with an optical focusing unit that can produce a magnified image of an object to be observed and with an illumination device whose light is at least partially applicable for illuminating the object to be observed, whereby the illumination device is composed of at least one luminous diode, which is arranged in the magnifying device in such a way that its light can emerge from the magnifying device essentially straight toward the direction of the object to be observed.

19 Claims, 2 Drawing Sheets

ILLUMINATED OPTICAL ENLARGEMENT DEVICE

RELATED APPLICATIONS

The present application claims priority to German Patent Application No. 199 50 899.2 filed Oct. 22, 1999 the entirety of which is herein incorporated by reference.

BACKGROUND OF THE INVENTION

1. Field Of The Invention

The present invention concerns an illuminated optical magnifying device, in particular a magnifying device with an optical focusing unit that can produce a magnified image of an object to be viewed and with an illumination device whose light can at least partially be used to illuminate the object to be lit.

2. The Prior Art

A magnifying device of the type described above is recognized from the German Patent Specification DE 39 15 119 C1. For the magnifying device described therein, which is primarily applicable as a reading lens, the focusing unit consists of a plano-convex lens and a plano-concave lens whose concave surface faces the plane surface of the plano-convex lens so that, except for the outer ring-shaped edge of the plane surface of the plano-convex lens, there is an air gap between the two lenses. The two lenses of this focusing unit describe an essentially circular contour whereby incandescent bulbs are arranged in equal angular intervals along the outer edge of the plano-concave lens. This arrangement is part of the illumination device of the recognized state-of-the-art magnifying device. The light emanating from these incandescent bulbs spreads out through the plano-concave lens and is almost totally reflected off the concave surface bordering the air gap in the direction of the plane surface of the plano-concave lens so that the light emanating from this plane surface can illuminate at a distance from it an object intended to be viewed in magnification by means of a magnifying device constructed as a reading lens. The reading lens described above is provided with a ring-shaped mounting surrounding the focusing unit on which a handle is provided for holding a battery.

A disadvantage for the abovementioned device presents itself in that, due to the relatively high-energy consumption of the incandescent bulbs, the batteries must be changed frequently. Furthermore, one must provide for the possibility of changing the incandescent bulbs since these come with only a limited lifetime. In addition, a considerable drawback is incurred with the device mentioned in directing the light emitted by the incandescent bulbs to the object to be observed by means of reflection from the concave surface of the plano-concave lens. The air gap necessitated by the setup and the arrangement of the plano-concave lens prevent a configuration of the focusing unit that would optimize the optical imaging of the object to be observed.

BRIEF DESCRIPTION OF THE INVENTION

The basic task of the present invention is the creation of a magnifying device of the type mentioned at the beginning that has a simple configuration and presents small energy expenditure in providing good illumination to an object to be observed.

This is achieved according to the invention by having the illumination device contain at least one luminous diode, which is so arranged in the magnifying device that its light can emerge directly from the magnifying device in the direction of the object to be observed. In contrast to the known state-of-the-art incandescent bulbs, the current consumption of a luminous diode is in general considerably smaller so that a current supply provided in the magnifying device, as for example a battery or rechargeable battery, would only need to be changed quite infrequently. Furthermore, presently available luminous diodes have a lifetime of about 100,000 hours so that the magnifying device can be configured simply since, in contrast to the known state-of-the-art luminous bulbs, changing at least one luminous diode is no longer necessary. In addition, because of the essentially direct light emission in the direction of the object to be observed, a complicated design of the magnifying device is avoided. It is no longer necessary to expend a relatively large amount of effort as with, for example, the above mentioned state of the art in order to direct the light from at least one incandescent bulb as effectively as possible on the object to be observed using, for example, total reflection. The focusing unit can then be configured independently from the function of object illumination as is necessary with the state of the art so that conventional lens errors such as spherical aberration, astigmatism, field curvature, distortion and chromatic aberration can be largely avoided. In addition, by doing away with the illumination function of the focusing unit, its entire geometric lens surface can be used optically.

In a preferred design for carrying out the present invention, at least one luminous diode is designed so that it emits white light, in particular with a color temperature of around 6500 K. It turns out that the quality of an image for the human eye is to a certain extent dependent on the color temperature of the illumination. White light, for example, gives a clearer contrast than yellow light. Thus the use of white luminous diodes, in particular with a color temperature of around 6500 K, would make a particularly good image possible. Light diodes of the type mentioned produce only a small amount of heat during their use, first because of their low energy consumption and second because of their high efficiency in converting electric current into light. The design of the magnifying device can thus dispense with precautions for equalizing thermal stresses. In addition, the region to be observed would be extremely well illuminated by the white neutral light, in particular for an application of the magnifying device according to the invention as a reading lens, with, at the same time, low energy consumption.

In a preferred design for carrying out the present invention, the focusing unit would have an essentially circular cross-section or shape whereby the illumination device would consist of a number of luminous diodes that are arranged around the focusing unit preferably in equal angular intervals. In this way a particularly efficient illumination of the object to be observed is obtained.

The focusing unit can include at least one convex lens and/or at least one achromatic lens that are applicable for the focusing of the object to be observed. As previously mentioned, the focusing unit can be optimized as desired based on its imaging characteristics. For example, the focusing unit can be so arranged that the magnifying device serves as a reading lens.

It is then possible, for example, to provide at least one of the optically functional surfaces of the focusing unit being used for the imaging of the object to be observed with at least one reflection-reducing coating. At least one coating can also be realized as a multiple coating so that the residual reflection in the visible spectral range would be limited to less than 1%, preferably less than 0.5%. In this way, the imaging characteristics can be further improved for the observer.

In a preferred design for carrying out the present invention, the magnifying device can include a handle in which the current supply for at least one luminous diode is located, whereby at least one luminous diode is preferably connected with the current supply by way of a switch located on the handle. A battery or rechargeable battery can be used as current supply. Placing the current supply in a handle gives the magnifying device a compact design.

The focusing unit can be advantageously surrounded with a ring-shaped mounting in which at least one luminous diode is placed. The ring-shaped mounting can then be attached to the abovementioned handle. It is further possible to place openings on the side of the ring-shaped mounting directed toward the object to allow the light from the various luminous diodes to exit. For this, the luminous diodes can be placed, for example, at equal angular intervals around the focusing unit. In this way, the result is a very uncomplicated design for the magnifying device according to the invention since, after all, only a ring-shaped mounting with a handle is provided wherein the luminous diodes used for illumination are placed in simple boreholes in the ring-shaped mounting. In contrast to the quite complicated state of the art, the magnifying device according to the invention produces in this way a more robust, more compact design.

In a preferred design for carrying out the present invention, the focal length of the focusing unit and the beam angle of at least one light diode is matched to each other in such a way that, at an optimal separation of the object to be observed from the focusing unit as given by the focal length of the focusing unit, the object is optimally illuminated by at least one of the luminous diodes. In particular, for several luminous diodes, this would be precisely the case if the light from neighboring luminous diodes already overlaps at the abovementioned optimal separation. This would then avoid having a dark spot appear in the center of the focusing unit because the light of the luminous diodes arranged, for example, in a circle around the focusing unit to not yet overlap in the center of the region to be observed in the object.

In a preferred design for carrying out the present invention, the magnifying device is surrounded by a housing that has, on its side that will be directed toward the object to be observed, a positioning surface for placement on the object to be observed. Such a design for carrying out a magnifying device according to the present invention is particularly appropriate as a dermatoscope since the positioning surface can here be directly placed on the area of the patient's skin to be examined.

It may be expedient if the focusing unit or part of the focusing unit can be moved toward or away from the direction of the positioning surface. Through this displacement of the focusing unit, the doctor observing the region of the skin or other user of the magnifying device can put the resultant magnified image of the region of the skin in sharp focus.

As an alternative to the abovementioned embodiments, a magnifying device according to the invention can also be implemented as a large-surface viewing device, and in particular as a watchmaker's lens or something similar.

BRIEF DESCRIPTION OF THE DRAWINGS

Further characteristics and advantages of the present invention are made clear using the following description of preferred embodiments with reference to the accompanying illustrations. In these are shown.

DETAILED DESCRIPTION OF A PREFERRED EMBODIMENT

Figure 1:
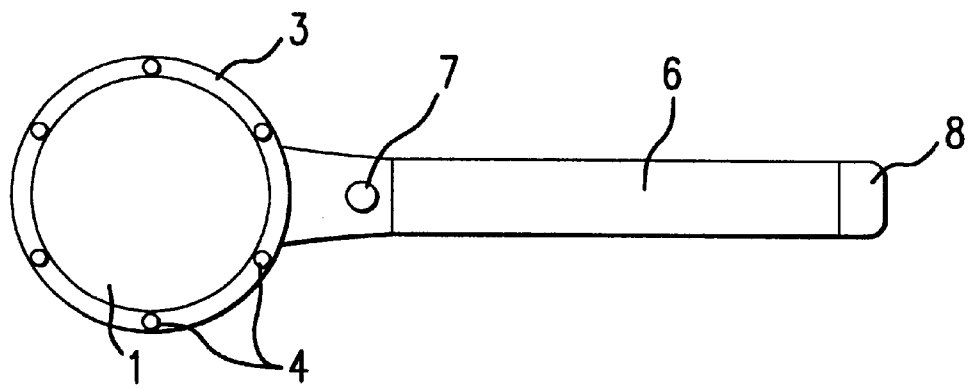
FIG. 1 is a top view of a first design of a magnifying device according to the present invention.

As illustrated in FIG. 1, the illuminated optical magnifying device shown in the includes an optical focusing unit 1, which in the design example shown has a circular contour or ring-shaped cross-section. This optical focusing unit 1 can, for example, comprise of at least one convex lens or also of achromatic lenses or a combination of convex lenses and achromatic lenses or something similar. According to the invention, the optical focusing unit 1 can be so configured that lens errors such as spherical aberration, astigmatism, field curvature, distortion and chromatic aberration can be largely eliminated. The additional possibility exists of providing at least one of the optically functional surfaces used for focusing with a reflection-reducing coating. In particular, a multiple coating can be applied so that reflections in the visible spectral range could be reduced to less than 1%, in some cases less than 0.5%.

Figure 2:
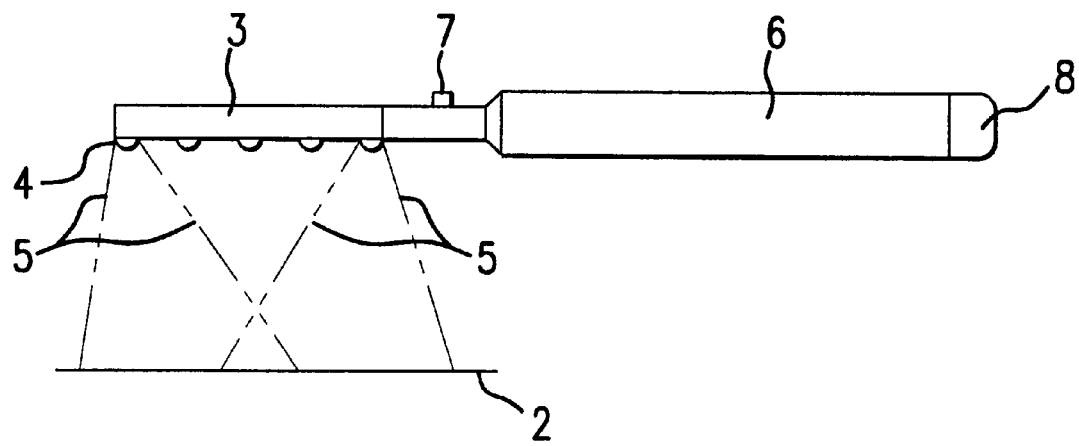
FIG. 2 is a side view of the magnifying device according to the invention as shown in FIG. 1.

As shown in FIG. 2, the magnifying device, as with using a magnifying glass, an object 2 can be focused so that an observer on the opposite side of the optical focusing unit 1 as the object 2 looking into it sees a magnified image of the object 2.

Referring now to FIG. 1, the optical focusing unit 1 is surrounded by a ring-shaped mounting 3. On its side, directed toward the object to be observed, the ring-shaped mounting 3 is provided with openings, which in the embodiment shown are arranged around the focusing unit 1 in equal angular intervals. Specifically, as shown in FIG. 1, six openings are arranged in the mounting 3. Protruding from these openings are the tips of luminous diodes 4 each affixed in the space of one of the openings in the ring-shaped mounting 3 whose light can spread out from the ring-shaped mounting 3 in the direction of the object 2. As shown in FIG. 2, the beam edges 5 of light emanating from some of the luminous diodes 4 are shown. The focal length of the focusing unit 1 and hence the optimal separation between object 2 and focusing unit 1 is advantageously correlated with the beam angle of the luminous diodes 4. At the optimal separation between object 2 and focusing unit 1, the object is essentially evenly illuminated, in particular without a dark area in the middle. This optimization would be achieved if the light emitted from neighboring luminous diodes 4 already overlap at the abovementioned optimal separation from the focusing unit 1.

The luminous diodes 4 are ideally realized as so-called white light diodes whose light can have a color temperature of around 6500 K.

As illustrated in FIGS. 1 and 2, the ring-shaped mounting 3 is joined with handle 6. A current supply, which can, for example, be realized as a battery or rechargeable battery, can be placed in handle 6. The current supply is connected by electric conductors to the luminous diodes 4 across a switch 7 also located in the area of the handle. On the end of the handle 6 opposite from the ring-shaped mounting 3, a handle cap 8 can be placed, which can be unscrewed to allow the user access to the current supply, that is, to the battery or rechargeable battery.

Figure 3:
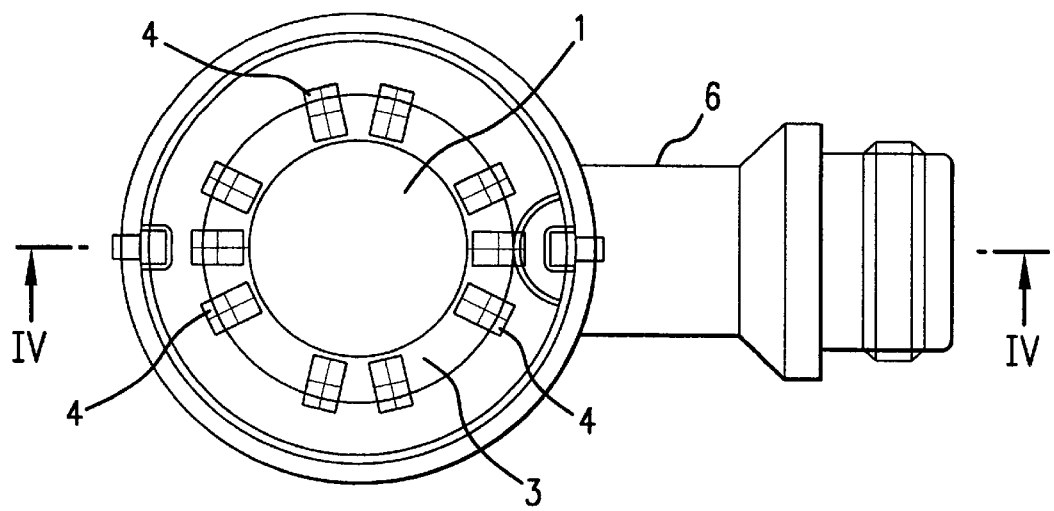
FIG. 3 is a top view of a second design of a magnifying device according to the invention.
Figure 4:
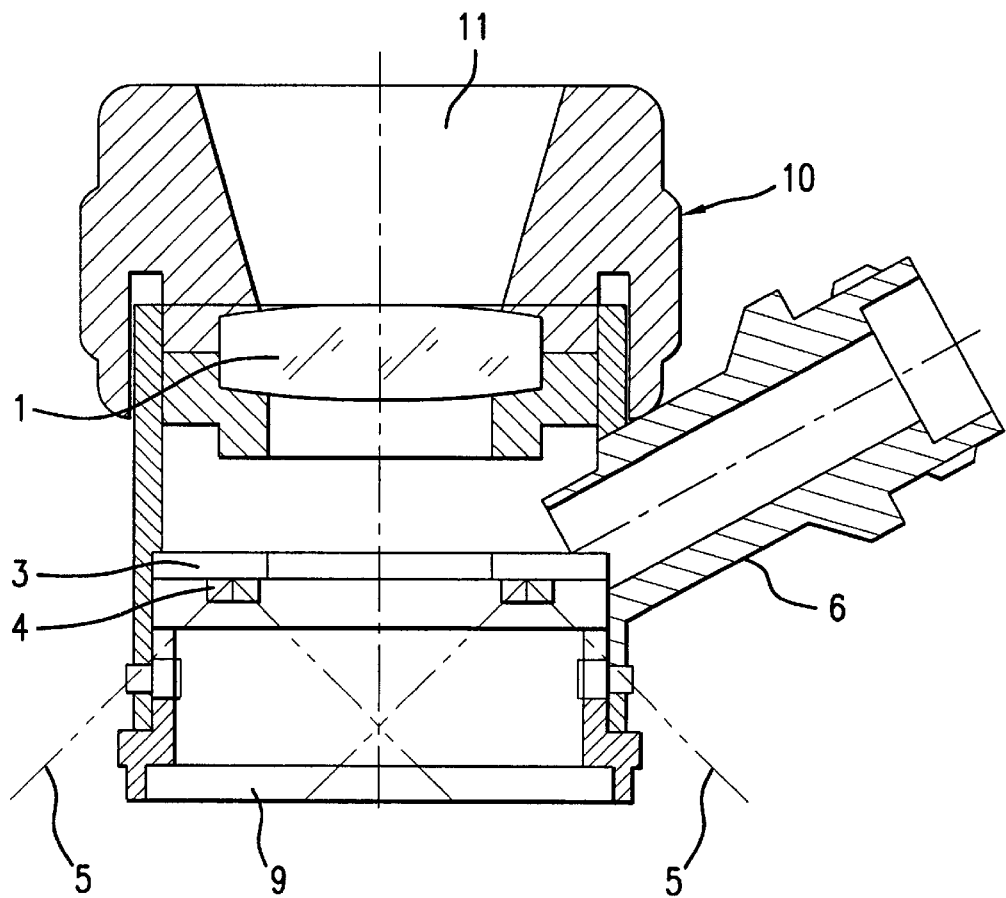
FIG. 4 is a cross-sectional view of the magnifying device as indicated by the arrows IV—IV in FIG. 3.

A further design for a magnifying device according to the invention can be seen in FIG. 3 and FIG. 4. This design can be utilized in particular as a dermatoscope. Corresponding parts in FIG. 3 and FIG. 4 have corresponding reference numbers with FIG. 1 and FIG. 2. A focusing unit 1, with which the observer can observe a magnified image of the object, is also provided in the magnifying device according to FIGS. 3 and 4.

In contrast to the previously mentioned design, the design according to FIG. 3 and FIG. 4 has a discrete positioning surface 9, which consists of an at least partially transparent plate located on the underside of a housing 10. Both the focusing unit 1 as well as a ring-shaped mounting 3 for luminous diodes 4 are accommodated within housing 10. The light coming from the luminous diodes 4, as clearly demonstrated by the beam edges 5, pass through the lower plate and optimally illuminate an object lying on the underside of the positioning surface 9. The light reflected back from this object passes back through the lower transparent plate into the housing 10, through the central cavity of the ringshaped mounting 3, through the focusing unit 1 and upward from there out through the upper opening 11 of the housing 10.

The focusing unit 1 is presented in the sample design depicted in FIGS. 3 and 4 only schematically as a convex length. The focusing unit 1 can be much more complicated, in particular the focusing unit 1 may be constructed from several lenses. In addition, the focusing unit 1 can be mounted with adjustable height in the housing 10, so that the user of the magnifying device according to the invention can put the image of the object produced in sharp focus. In particular, the focusing unit 1 may also be composed of several lenses with adjustable height relative to each other.

It can further be seen in FIG. 4, that the design depicted there for a magnifying device according to the invention also contains a handle 6, which can likewise contain a grip cap on its end for receiving or changing a battery.

The design of a magnifying device according to the invention presented in FIGS. 3 and 4 allows, for example, in the context of a dermatoscopic examination, the placement of the housing 10 with the positioning surface 9 on a section of the patient's skin. With the use of an intense white light diode, for example, this section of the skin can be optimally illuminated so that the examining doctor can observe a very clear, intense, magnified image of the relevant section of the patient's skin through the upper opening 11.

Instead of the abovementioned design examples, which concern a reading lens and a dermatoscope, a magnifying device according to the invention can also be implemented as a large-surface viewing device, for example as a watchmaker's lens or something similar.

What is claimed is:
1. Illuminated optical magnifying device comprising:
   an optical focusing unit that can produce a magnified image of an object; and
   an illumination device including at least one luminous diode, which is arranged in the magnifying device in such a way that its light can emerge from the magnifying device essentially straight toward the direction of the object to be observed.
2. The magnifying device as in claim 1, wherein:
   at least one luminous diode is designed so that it can emit white light, in particular with a color temperature of around 6500 K.
3. The magnifying device as in claim 1, wherein:
   the optical focusing unit has an essentially circular contour or cross-section whereby the illumination device contains a plurality of luminous diodes, which are arranged in equal angular intervals around the optical focusing unit.
4. The magnifying device as in claim 1, wherein:
   the focusing unit includes at least one convex lens that can be used for producing an image of the object (2) to be observed.
5. The magnifying device as in claim 1, wherein:
   the focusing unit includes at least one achromatice lens that can be used for producing an image of the object to be observed.
6. The magnifying device as in claim 1, wherein:
   the focusing unit includes at least one convex lens and at least one achromatic lens that can be used for producing an image of the object to be observed.
7. The magnifying device as in claim 1, wherein:
   the focusing unit used for producing an image of the object to be observed is provided with at least one reflection-reducing coating.
8. The magnifying device as in claim 7, wherein:
   at least one coating is realized as a multiple coating so that the residual reflection from the focusing unit in the visible spectral range is limited to less than 1%, preferably less than 0.5%.
9. The magnifying device as in claim 1, wherein:
   the magnifying device further includes a handle in which a current supply for at least one luminous diode 4 is located, wherein said diode 4 is preferably connected to said current supply by way of a switch disposed on the handle.
10. The magnifying device as in claim 9, wherein:
    the current supply is a battery.
11. The magnifying device as in claim 9, wherein:
    the current supply is a rechargeable battery.
12. The magnifying device as in claim 1, wherein:
    the focusing unit is surrounded by a ring-shaped mounting in which the luminous diodes are placed, whereby the ring-shaped mounting is preferably connected with the handle.
13. The magnifying device as in claim 12, wherein:
    the ring-shaped mounting further includes at least one opening that is to be directed toward the object to be viewed which allows light from the luminous diode to exit.
14. The magnifying device as in claim 1, wherein:
    the magnifying device includes a housing that has a distinct positioning surface on its end to be directed toward the object to be observed.
15. The magnifying device as in claim 14, wherein:
    the focusing unit is disposed within in the housing so as to be movable either toward or away from the direction of the positioning surface.
16. The magnifying device as in claim 1, wherein:
    the focal length of the focusing unit and the beam angle of at least one luminous diode are matched to each other in such a way that, at an optimal separation of the object to be observed from the focusing unit as given by the focal length of the focusing unit, the object is optimally illuminated by the light of at least one of the luminous diodes.
17. The magnifying device as in claim 1, wherein:
    the magnifying device is realized as a reading lens.
18. The magnifying device as in claim 1, wherein:
    the magnifying device is realized as a dermatoscope.
19. The magnifying device as in claim 1, wherein:
    the magnifying device is realized as a large-surface viewing device, in particular as a watchmaker's lens.

* * * * *